United States Patent [19]
Krounbi

[11] Patent Number: 4,939,837
[45] Date of Patent: Jul. 10, 1990

[54] BATCH FABRICATION PROCESS FOR MAGNETIC HEADS

[75] Inventor: Mohamad T. Krounbi, San Jose, Calif.

[73] Assignee: International Business Machines Corporation, Armonk, N.Y.

[21] Appl. No.: 239,562

[22] Filed: Sep. 1, 1988

[51] Int. Cl.⁵ ............................................. G11B 5/42
[52] U.S. Cl. ................................. 29/603; 427/130; 427/131
[58] Field of Search ................ 29/603; 360/126, 113; 427/128, 130, 131

[56] References Cited

U.S. PATENT DOCUMENTS 4,195,323  3/1980  Lee .................................... 360/113
4,354,212 10/1982  Nouchi et al. ..................... 360/113
4,489,484 12/1984  Lee ..................................... 29/603

Primary Examiner—Carl E. Hall
Attorney, Agent, or Firm—Otto Schmid, Jr.

[57] ABSTRACT

A process for the batch fabrication of an array of shielded magnetoresistive (MR) read transducers comprising the steps of depositing a full film over the entire substrate of a first magnetic shield layer, a first non-magnetic gap layer and sputter depositing a layer of MR sensor material in the presence of a magnetic field for orienting the anisotropy axes of the layers of MR sensor material in a chosen direction. The MR sensor layer and the first gap layer are permitted to produce a plurality of MR read transducers, and the first magnetic shield layer is then patterned to produce a first shield for each of the MR read transducers. A second gap layer and a second shield layer are patterned to produce a second shield for each of the MR read transducers.

4 Claims, 2 Drawing Sheets

BATCH FABRICATION PROCESS FOR MAGNETIC HEADS

BACKGROUND OF THE INVENTION

FIELD OF THE INVENTION

The present invention relates to magnetic heads which include a magnetoresistive (MR) read transducer, and, more particularly to a process for the batch fabrication of such transducers.

DESCRIPTION OF THE PRIOR ART

The prior art discloses a magnetic transducer referred to as a magnetoresistive (MR) sensor or head which has been shown to be capable of reading data from a surface at great linear densities. An MR sensor detects magnetic field signals through the resistance changes of a read element made from a magneto-resistive material as a function of the amount and direction of magnetic flux being sensed by the MR element.

The drive toward increased recording density has led to the requirement for narrower recording tracks and increased linear recording density along the tracks. In order for an MR read head to be capable of reading data from a magnetic medium at these high recording densities, the MR element must be incorporated in the gap between two soft magnetic shields. To efficiently produce the small MR sensors which are necessary to meet these requirements, a batch fabrication process must be used.

U.S. Pat. Nos. 4,195,323 and 4,489,484 to Lee disclose a batch fabrication method in which an inductive write transducer and a shielded MR read transducer form an array of read/write transducers. The transducers are fabricated on a wafer and then diced into individual transducers so that the thickness of the wafer establishes the length of the slider for the read/write transducer. The shields are patterned individually for each MR read transducer.

U.S. Pat. No. 4,354,212 to Nouchi et al discloses an MR sensor in which hard magnetic bias layers are provided on each side of the MR layer, and the MR structure is enclosed between two shields. No batch fabrication technique is disclosed, but an orienting field of 600 Oersted is used in the process described for producing individual sensors.

Prior art MR sensors in which the MR element was produced by a sputter deposition process have either been unacceptable or have had a large spread in sensor characteristics. This problem was due to the orienting magnetic field (Ho) required to set the induced easy axis of the MR layer in a preferred direction. The orienting field (Ho) is shunted by the shield underneath. To effectively orient the MR layer the orienting field Ho must exceed by some margin the demagnetizing field (Hd) of the first shield which, in a specific embodiment, has been calculated to be over 100 Oe. The orienting field Ho in the sputtering system is less than 30 Oe, so the direction of the easy axis of the MR layer and of other layers such as biasing layers, for example, is undefined, which can lead to unacceptable sensor characteristics. However, if a higher magnetic field is used in the sputtering system, the thickness uniformity of the MR layer is adversely affected due to field plasma interactions.

The prior art does not disclose a batch fabrication process for sputter deposited shielded MR read transducers in which the MR elements are of uniform thickness and magnetically oriented uniformly in a chosen direction.

SUMMARY OF THE INVENTION

It is therefore the principal object of this invention to provide a batch fabrication process for shielded magnetoresistive (MR) read transducers in which the anisotropy axes of certain layers of the transducers are magnetically oriented in a chosen direction and in which the transducers have uniform thickness.

In accordance with the invention, a process for the batch fabrication of shielded MR read transducers comprises the steps of depositing a first layer of magnetic material over the entire substrate, depositing a layer of suitable electrically insulating material over the first layer of magnetic material, and sputter depositing, in the presence of a magnetic field, a second layer of magnetic material over the layer of electrically insulating material. The second layer of magnetic material is patterned to form a plurality of MR read transducers magnetically oriented in a chosen direction, and the first layer of magnetic material is then patterned to produce a first shield for each of the MR read transducers. A second layer of electrically insulating material and a third magnetic layer are patterned to produce a second shield for each of the MR read transducers.

The foregoing and other objects, features and advantages of the invention will be apparent from the following more particular description of a preferred embodiment of the invention as illustrated in the accompanying drawings.

DESCRIPTION OF THE PREFERRED EMBODIMENT

Figure 1:
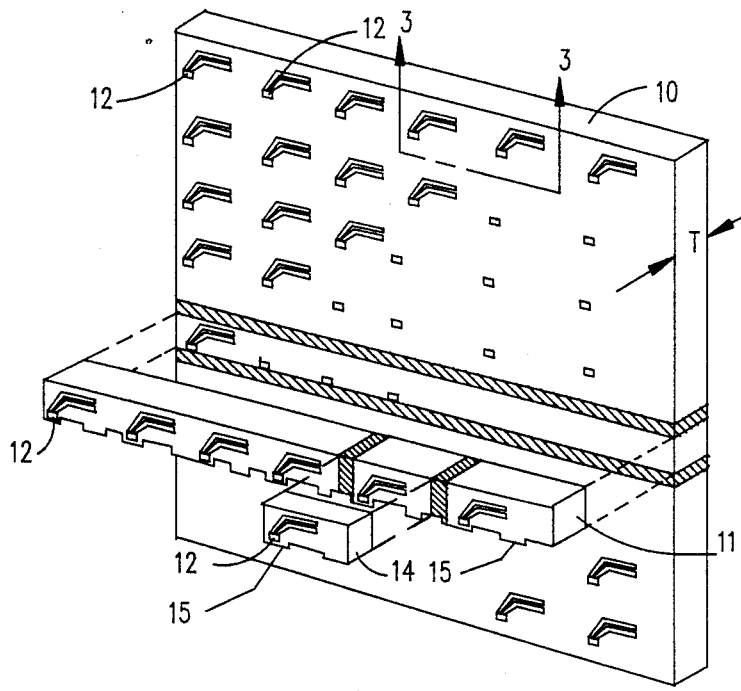
FIG. 1 is a sketch showing a three-dimensional view of a substrate, showing some parts in an exploded view, upon which an array of magnetoresistive (MR) read transducers are produced in a batch fabrication method.

A specific embodiment of the process comprising the invention will be described in conjunction with FIG. 1 of the drawing.

The batch fabrication process for magnetoresistive (MR) read heads is accomplished by preparing a nonmagnetic substrate 10 having a thickness T which, when added to the thickness of the deposited MR read head assemblies 12, will equal the length of the finished head sliders 14. As known in the art, a thin film inductive head (not shown) may also be produced on the same head slider 14 so that both read and write transducers are on the same slider 14.

Figure 2:
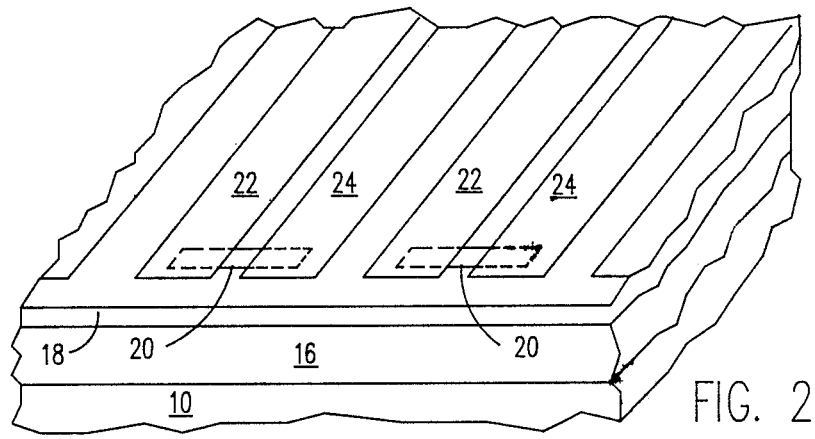
FIG. 2 is a perspective view of a plurality of MR read heads as constructed at an intermediate stage of the method of the present invention.
Figure 6:
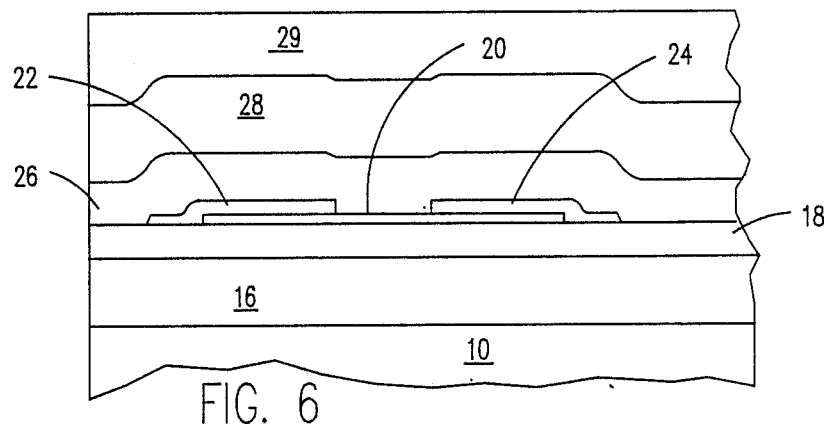
FIG. 6 is a completed MR read transducer as seen from the air bearing surface.

The MR read head assemblies 12 comprise a first magnetic shield member 16 (FIG. 2) which is deposited on substrate 10, and upon which is deposited a first nonmagnetic gap layer 18. An MR sensor element 20 is deposited and each end of sensor element 20 is contacted by electrically conductive leads 22 and 24. A second nonmagnetic gap layer 26 (FIG. 6) and a second magnetic shield member 28 (FIG. 6) complete the MR read head assemblies 12.

When the MR read head assemblies 12 have been formed on the substrate 10, the substrate 10 is cut into rows 11 (FIG. 1) and then into individual head sliders 14 so that the MR sensor element 20 is located at an air bearing surface 15 at the trailing end of the slider 14.

Figure 3:
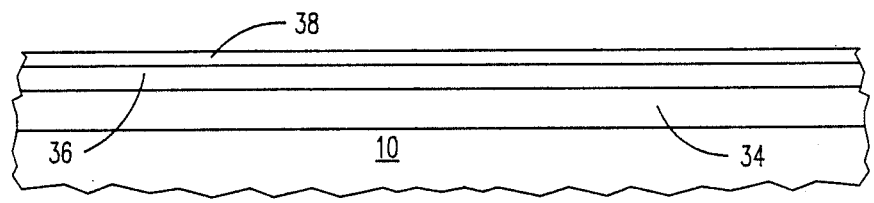
FIG. 3 is a section view along lines 3—3 of FIG. 1 taken after deposition of the sensor layer.

The process for batch fabrication of the shielded MR read head assemblies, according to the present invention, comprises the steps of (see FIG. 3) depositing a first layer 34 of magnetic material over the entire substrate to serve, when patterned, as the first shield member 16 for each of the MR read head assemblies. The magnetic material may comprise any material suitable for use as a shield such as NiFe, for example. The magnetic shield material may be deposited by any suitable technique such as sputtering or plating, for example. A layer 36 of insulating material, such as $SiO_2$, for example, is deposited over the entire shield layer 34 to electrically isolate the MR sensor element from the first shield member.

A layer 38 of MR sensor material (see FIG. 3) is deposited over the entire layer 36 of insulating material to a desired thickness which must be closely controlled so that the characteristics of each of the MR read head assemblies will be substantially the same. The layer 38 of MR sensor material is deposited by sputtering in the presence of an orienting magnetic field (Ho). The orienting field Ho in the sputtering system is about 30 Oe, and the demagnetizing field (Hd) in this case, Hd produced by full film shield layer 34, is less than one Oe. The condition for proper alignment of the easy axis (Ea) of the MR layer is that Ho>>Hd, and this condition is met in this deposition system since the MR sensor layer 38 experiences an orienting field exceeding 20 Oe which is sufficient for inducing an Ea along the field direction.

Figure 4:
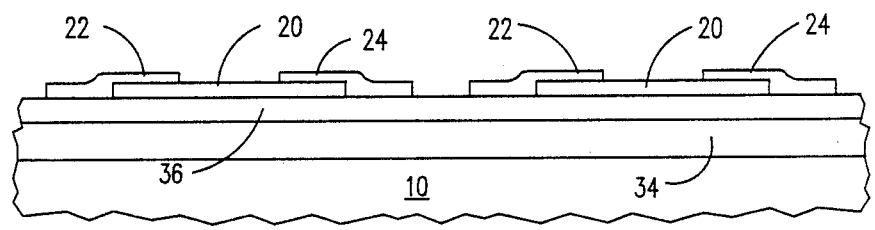
FIG. 4 is a section view along lines 3—3 of FIG. 1 taken after patterning of the sensor and conductor layers.

The MR sensor layer 38 is then patterned (see FIG. 4) to define the desired MR sensor 20 shape (FIG. 2) for each of the MR read head assemblies. Should additional layers, such as biasing layers, for example, be part of the MR sensor, they would also be patterned at this stage of the process. The conductor leads 22 and 24 are then deposited and patterned (see FIGS. 2 and 4) to define the active region of the MR sensor, i.e. the part of the MR sensor extending between the inner edges of conductor leads 22 and 24. A second insulation layer 40 is deposited (FIG. 5) to electrically isolate the MR sensor 20 from the second shield member 28 as well as to passivate the sensor structure from subsequent processing steps.

Figure 5:
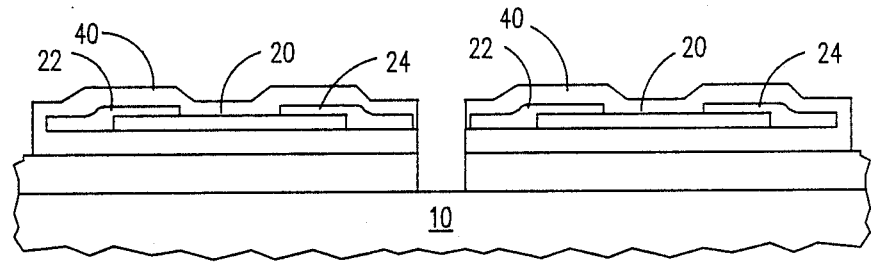
FIG. 5 is a section view along lines 3—3 of FIG. 1 taken after patterning of the layers of electrically insulating material and the first shield layer.

Now that the easy axis of the sensor layers as well as the sensor structure is defined, the electrically insulating layers 36 and 38 and the first shield layer 34 are patterned (FIG. 5). Either a dry etch or a chemical etch process can be used. When using a dry etch process such as ion milling, for example, all three layers 36, 38 and 40 are patterned using a single masking step. In case a chemical etch process is used, two separate masking steps can be used, one for the layers 36 and 40 of insulating material, and a second mask for etching the first shield layer 34.

The second shield layer is then deposited and patterned (FIG. 6) to produce a second magnetic shield 28 for each of the MR read head assemblies 12 and a protective coating 29 is then deposited and patterned. This processing completes each of the assemblies so that they can then be cut into rows and then into individual assemblies as described above and as shown in FIG. 6.

The process of the present invention has the advantage of reducing the demagnetizing field of the first shield layer to a sufficiently small magnitude such as less than 1 Oe, for example, in its unpatterned state. This level of demagnetizing field permits a preset direction of the easy axis of the MR layer to be established by the field normally present in the sputtering system. This level of demagnetizing field also permits a reduction of the strength of the orienting field within the sputtering system and still retain a defined easy axis direction. This change results in improved thickness control of the MR layer. Both the easy axis alignment and the improved thickness control enhance the stability and reproducibility of the MR sensor characteristics of the MR sensor assemblies fabricated by the described process.

While the MR sensor has been described as having a single layer, it will be apparent to those skilled in the art that additional layers for properly biasing the sensor, for example, can also be included in the process without materially changing the process. In addition, the second shield layer can be deposited prior to patterning the first shield layer 34. After that the second shield layer, electrically insulating layers 36 and 38, and the first shield layer 34 can be patterned simultaneously or sequentially.

While the invention has been particularly shown and described with reference to a preferred embodiment thereof, it will be understood by those skilled in the art that various other changes in the form and details may be made therein without departing from the spirit and scope of the invention.

Having thus described my invention, what I claim as new, and desire to secure by Letters Patent is:

1. The method for batch fabrication of a plurality of magnetic heads each comprising a magnetoresistive (MR) read transducer, said magnetic heads being formed in a plurality of rows on a substrate, each of said rows having a plurality of magnetic heads therein, said method comprising the steps of:

depositing a first layer of magnetic material over the substrate of a predetermined thickness;

depositing a layer of suitable electrically insulating material of a predetermined thickness over said first layer of magnetic material;

sputter depositing, in the presence of a magnetic field, a second layer of magnetic material of a predetermined thickness over said layer of electrically insulating material, said magnetic field being operable to orient said second layer of magnetic material in a preferred direction;

patterning said second layer of magnetic material to form a plurality of MR read transducers, each having its easy axis in a selected direction; and then patterning said first layer of magnetic material to form a shield for each of said MR read transducers whereby said thickness and said preferred orientation of said MR transducers is maintained at the thickness and direction, respectively, established during said sputter depositing step.

2. The method of claim 1 additionally comprising depositing a second layer of suitable electrically insulating material of a predetermined thickness over said second layer of magnetic material;

depositing a third layer of magnetic material over said second layer of magnetic material; and patterning said second layer of electrically insulating material and said third layer of magnetic material to form a second shield for each of said MR read transducers.

3. The method of claim 2 wherein said step of patterning said second layer of electrically insulating material and said third layer of magnetic material is carried out prior to the step of patterning the first layer of magnetic material.

4. The method of claim 2 comprising the additional step of separating said assembly into a plurality of individual magnetic heads.

* * * * *

UNITED STATES PATENT AND TRADEMARK OFFICE
CERTIFICATE OF CORRECTION

PATENT NO. : 4,939,837

DATED : July 10, 1990

INVENTOR(S) : M. T. Krounbi

It is certified that error appears in the above-identified patent and that said Letters Patent is hereby corrected as shown below:

In Column 4, Line 42, delete "in", insert --as an assembly having--

Signed and Sealed this

Twenty-ninth Day of October, 1991

Attest:

HARRY F. MANBECK, JR.

*Attesting Officer*  *Commissioner of Patents and Trademarks*